United States Patent [19]

Pawlowski

[11] Patent Number: 5,696,910
[45] Date of Patent: Dec. 9, 1997

[54] METHOD AND APPARATUS FOR TRACKING TRANSACTIONS IN A PIPELINED BUS

[75] Inventor: Stephen S. Pawlowski, Beaverton, Oreg.

[73] Assignee: Intel Corporation, Santa Clara, Calif.

[21] Appl. No.: 533,919

[22] Filed: Sep. 26, 1995

[51] Int. Cl.$^6$ .................. H01J 13/00; G06F 13/38
[52] U.S. Cl. ............... 395/280; 395/293; 395/285; 395/200.08; 395/292; 395/250; 395/287; 395/288; 395/309
[58] Field of Search .................. 395/293, 285, 395/280, 200.08, 292, 250, 287, 288, 309

[56] References Cited

U.S. PATENT DOCUMENTS

| | | |
|---|---|---|
| 5,444,857 | 8/1995 | Rowland . |
| 5,535,340 | 7/1996 | Bell et al. . |
| 5,535,345 | 7/1996 | Fisch et al. . |
| 5,546,546 | 8/1996 | Bell et al. . |
| 5,548,733 | 8/1996 | Sarangdhar et al. . |
| 5,568,620 | 10/1996 | Sarangdhar et al. . |

OTHER PUBLICATIONS

Popescu, Val, Merle Schultz, John Spracklen, Gary Gibson, Bruce Lightner and David Isaman, "The Metaflow Architecture", IEEE Micro, Jun. 1991, pp. 10–13 and 63–73.

*Primary Examiner*—Jack B. Harvey
*Assistant Examiner*—Rupal D. Dharia
*Attorney, Agent, or Firm*—Blakely, Sokoloff, Taylor & Zafman

[57] ABSTRACT

A method and apparatus for tracking transactions in a pipelined bus includes a bus state tracking queue and control logic. The bus state tracking queue maintains a record of bus transaction information for each of a plurality of transactions pending on the bus. The control logic, coupled to the bus state tracking queue, updates the status of the plurality of transactions in the bus state tracking queue as the transactions progress through the pipeline.

22 Claims, 6 Drawing Sheets

5,696,910

METHOD AND APPARATUS FOR TRACKING TRANSACTIONS IN A PIPELINED BUS

BACKGROUND OF THE INVENTION

1. Field of the Invention

The present invention pertains to the field of computer systems. More particularly, this invention relates to tracking transactions on a pipelined computer system bus.

2. Background

Computer technology is continuously advancing, resulting in modern computer systems which provide ever-increasing performance. A wide variety of techniques are used by engineers and system designers to obtain this increased performance. One such technique is to couple multiple devices together using a high-performance computer system bus. These multiple devices can include, for example, processors and data storage devices. Thus, the speed at which these devices can communicate with one another can be increased, thereby increasing overall computer system performance, by improving the performance of the bus which couples these devices together.

One method of improving bus performance is to provide a pipelined bus. In a pipelined bus, bus transactions are separated into multiple stages or phases. A transaction is completed when it has gone through all, or in some instances fewer than all, of the stages of the bus. By pipelining the bus, multiple transactions can be in progress on the bus at the same time, with each transaction being in a different stage.

One difficulty presented by pipelined buses, however, is keeping track of all of the different transactions on the bus. That is, a pipelined bus with X number of stages or phases can have X number of transactions on the bus concurrently. Thus, it would be advantageous to provide a mechanism which provides for the tracking of all the transactions on the pipelined bus.

Additionally, one reason for pipelining a bus is to improve the bus performance, thereby improving the computer system performance. Thus, it would be beneficial to provide a mechanism which tracks the transactions on the pipelined bus without adversely affecting the performance of the computer system.

An additional technique used to increase computer system performance is to allow transactions to be completed out of order. By allowing transactions to be completed out of order, a transaction which has all of its response information (e.g., data or completion signals) available can be completed, even if previously issued transactions have not been completed yet. Thus, it would be advantageous to provide a mechanism which tracks the transactions on the pipelined bus while at the same time allows out of order transaction completion.

The present invention provides for these and other advantageous results.

SUMMARY OF THE INVENTION

A method and apparatus for tracking transactions in a pipelined bus is described herein. The apparatus includes a bus state tracking queue and control logic. The bus state tracking queue maintains a record of bus transaction information for each of a plurality of transactions pending on the bus. The control logic, coupled to the bus state tracking queue, updates the status of the plurality of transactions in the bus state tracking queue as the transactions progress through the pipeline.

In one embodiment of the present invention, a plurality of tracking elements are used to identify elements of the bus state tracking queue. These tracking elements include: a next request pointer which identifies the next element of the bus state tracking queue which will receive a request from the bus; a previous request pointer which identifies the element of the bus state tracking queue which most recently received a request from the bus; a snoop pointer which identifies an element of the bus state tracking queue which corresponds to a current snoop phase of the bus; an internal commit pointer which identifies an element of the bus state tracking queue which is next to receive internal status information; and a top of queue pointer which identifies the oldest active transaction on the bus.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances, well known methods, procedures, components, and circuits have not been described in detail so as not to obscure aspects of the present invention.

In the discussions which follow, certain signals are discussed followed by a "#". This notation is used to indicate a signal which is active when in a low state (that is, a low voltage). It is to be appreciated, however, that the present invention includes implementations where these signals are active when in a high state rather than when in a low state and where signals which are not followed by a "#" are active when in a low state.

Figure 1:
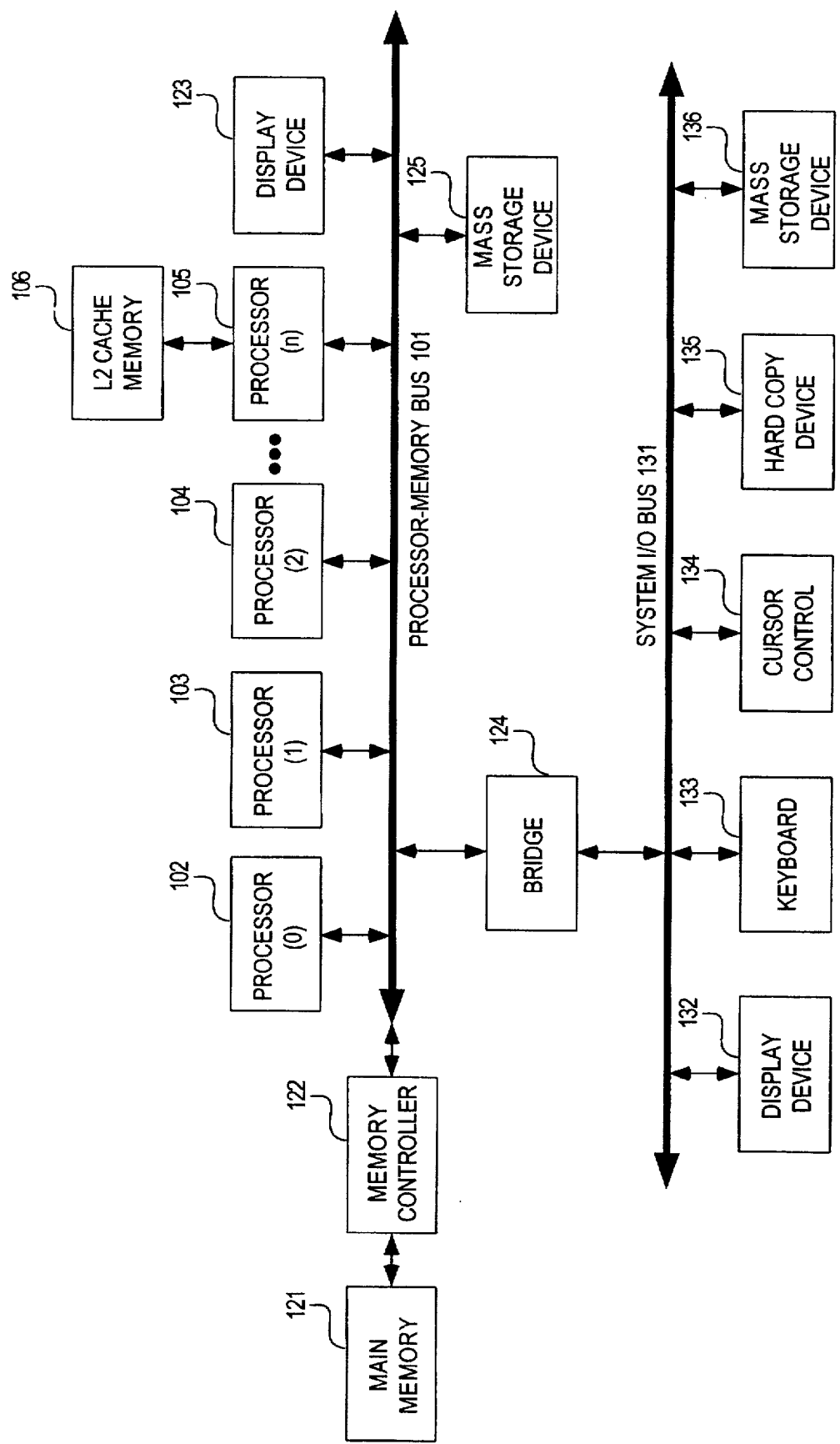
FIG. 1 shows an overview of an example multiprocessor computer system according to one embodiment of the present invention.

FIG. 1 shows an overview of an example multiprocessor computer system of the present invention. The computer system generally comprises a processor-memory bus or other communication means 101 for communicating information between one or more processors 102, 103, 104 and 105. The processor-memory bus 101 includes arbitration, address, data and control buses (not shown). In one embodiment, the processors 102 through 105 each includes a small, extremely fast internal cache memory (not shown), commonly referred to as a level one (L1) cache memory for temporarily storing data and instructions on-chip. In addition, a bigger, slower level two (L2) cache memory 106 can be coupled to any of the processors, such as processor 105, for temporarily storing data and instructions for use by the processor. Each processor may have its own, optional L2 cache, or some may share an L2 cache.

Processors 102, 103, and 104 may each be a parallel processor (a symmetric co-processor), such as a processor similar to or the same as processor 105. Alternatively, processors 102, 103, or 104 may be an asymmetric co-processor, such as a digital signal processor. In addition, processors 102 through 105 may be heterogeneous. In one embodiment, the present invention includes Intel® Architecture microprocessors as processors 102 through 105, such as i386™, i486™, or Pentium® processors. However, the present invention may utilize any type of microprocessor architecture. It is to be appreciated that the particular architecture(s) used are not especially germane to the present invention.

The processor-memory bus 101 provides system access to the memory and input/output (I/O) subsystems. A memory controller 122 is coupled to the processor-memory bus 101 for controlling access to a random access memory (RAM) or other dynamic storage device 121 (commonly referred to as a main memory) for storing information and instructions for processors 102 through 105. A mass data storage device 125, such as a magnetic disk and disk drive, for storing information and instructions, and a display device 123, such as a cathode ray tube (CRT), liquid crystal display (LCD), etc., for displaying information to the computer user may be coupled to the processor-memory bus 101.

An input/output (I/O) bridge 124 may be coupled to the processor-memory bus 101 and a system I/O bus 131 to provide a communication path or gateway for devices on either processor-memory bus 101 or I/O bus 131 to access or transfer data between devices on the other bus. Essentially, the bridge 124 is an interface between the system I/O bus 131 and the processor-memory bus 101.

The I/O bus 131 communicates information between peripheral devices in the computer system. Devices that may be coupled to the system bus 131 include, for example, a display device 132, such as a cathode ray tube, liquid crystal display, etc., an alphanumeric input device 133 including alphanumeric and other keys, etc., for communicating information and command selections to other devices in the computer system (e.g., the processor 102) and a cursor control device 134 for controlling cursor movement. Moreover, a hard copy device 135, such as a plotter or printer, for providing a visual representation of the computer images and a mass storage device 136, such as a magnetic disk and disk drive, for storing information and instructions may also be coupled to the system bus 131.

In one embodiment of the present invention, each of the bus agents coupled to the processor-memory bus 101 contains bus control circuitry which maintains a record of all outstanding transactions on the bus. This includes, for example, processors, memory controllers, bridges, and peripheral devices (such as storage or display devices).

In certain implementations of the present invention, additional processors or other components or buses may be included. Additionally, in certain implementations components may be re-arranged. For example, the L2 cache memory 106 may lie between the processor 105 and the processor-memory bus 101. Furthermore, certain implementations of the present invention may not require nor include all of the above components. For example, the processors 102 through 104, the display device 123, or the mass storage device 125 may not be coupled to the processor-memory bus 101. Additionally, the peripheral devices shown coupled to the system I/O bus 131 may be coupled to the processor-memory bus 101; in addition, in some implementations only a single bus may exist with the processors 102 through 105, the memory controller 122, and the peripheral devices 132 through 136 coupled to the single bus.

Figure 2:
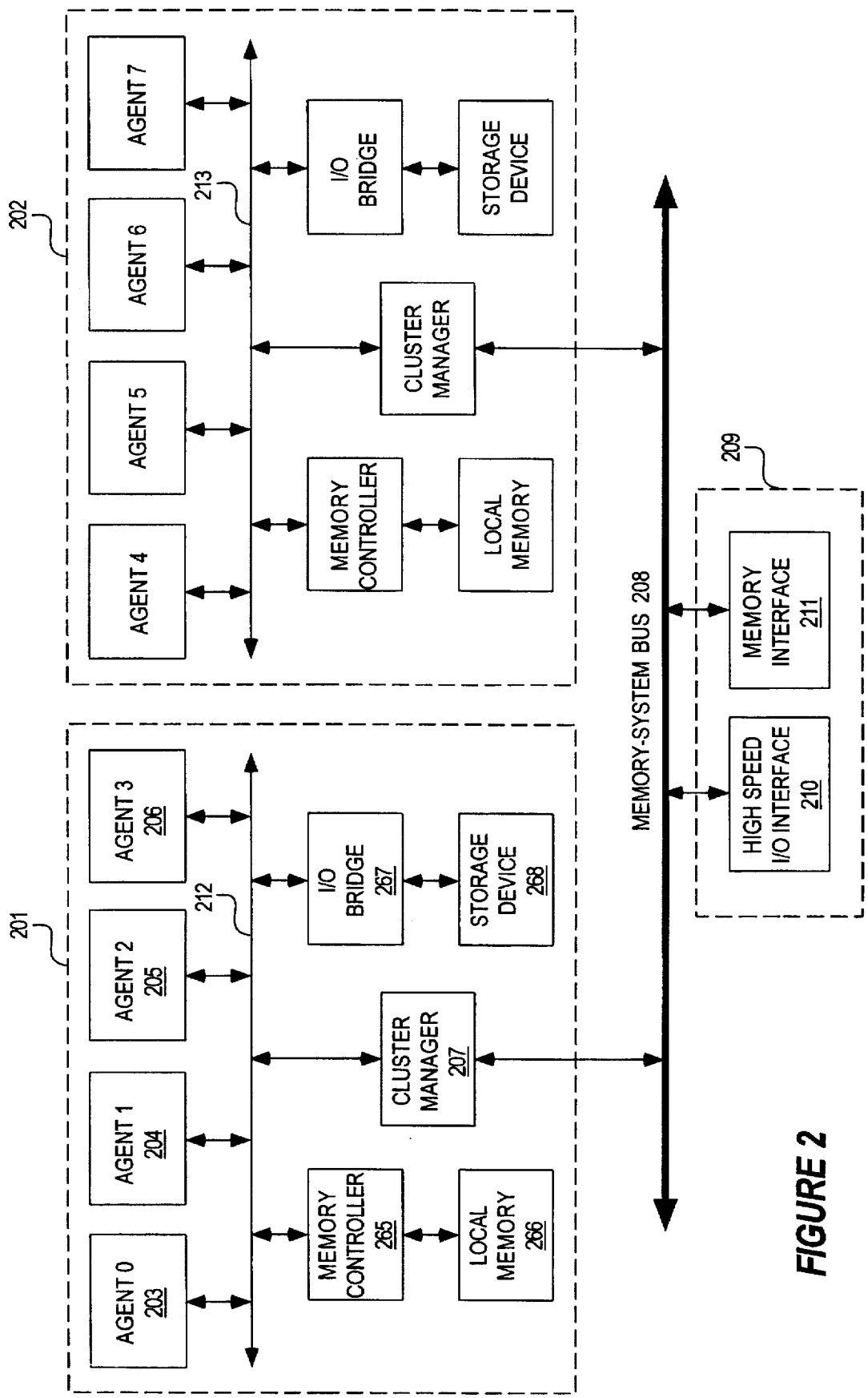
FIG. 2 is a block diagram showing a bus cluster system such as may be used in an alternatively configured system which uses the present invention.

FIG. 2 is a block diagram showing a bus cluster system such as may be used in an alternatively configured system which uses the present invention. FIG. 2 shows two clusters 201 and 202 of agents. Each of these clusters is comprised of a number of agents. For example, the cluster 201 is comprised of four agents 203–206 and a cluster manager 207, which may include another cache memory (not shown), coupled to the bus 212. The agents 203–206 can include microprocessors, co-processors, digital signal processors, etc.; for example, the agents 203 through 206 may be the same as the processor 102 shown in FIG. 1. The cluster manager 207 and its cache are shared between these four agents 203–206. Each cluster is coupled to a memory-system bus 208. These clusters 201 and 202 are coupled to various other components of the computer system through a system interface 209. The system interface 209 includes a high speed I/O interface 210 for interfacing the computer system to peripheral devices (not shown) and a memory interface 211 which provides access to a global main memory (not shown), such as a DRAM memory array. In one embodiment, the high speed I/O interface 210 is the bridge 124 of FIG. 1, and the memory interface 211 is the memory controller 122 of FIG. 1.

In one embodiment of the present invention, each cluster also includes a local memory controller and/or a local I/O bridge. For example, the cluster 201 may include a local memory controller 265 coupled to the processor bus 212. The local memory controller 265 manages accesses to a RAM or other local memory 266 contained within the cluster 201. The cluster 201 may also include a local I/O bridge 267 coupled to the processor bus 212. Local I/O bridge 267 manages accesses to I/O devices within the cluster, such as a mass storage device 268, or to an I/O bus, such as system I/O bus 131 of FIG. 1.

In one embodiment of the present invention, the buses 212 and 213 and the memory-system bus 208 operate analogous to the processor-memory bus 101 of FIG. 1.

Certain implementations of the present invention may not require nor include all of the above components. For example, the cluster 201 or 202 may comprise fewer than four agents. Alternatively, the cluster 201 or 202 may not include the memory controller, local memory, I/O bridge, and storage device. Additionally, certain implementations of the present invention may include additional processors or other components.

In one embodiment of the present invention, bus transactions occur on the processor-memory buses described above in FIGS. 1 and 2 in a pipelined manner. That is, multiple bus transactions may be pending at the same time, wherein each is not fully completed. Therefore, when a requesting agent begins a bus transaction by driving an address onto the address bus, the bus transaction may be only one of a number of bus transactions currently pending. Although bus transactions are pipelined, the bus transactions in the present invention do not have to be fully completed in order. Therefore, the present invention allows for completion replies to requests to be out-of-order. In one embodiment of the present invention, bus activity is hierarchically organized into operations, transactions, and phases. An operation is a bus procedure that appears atomic to software such as reading a naturally aligned memory location. Executing an operation usually requires one transaction but may require multiple transactions, such as in the case of deferred replies in which requests and replies are different transactions, or in unaligned memory operations which software expects to be atomic. In this embodiment, a transaction is the set of bus activities related to a single request, from request bus arbitration through the data transfer on the data bus.

In one embodiment of the present invention, a transaction contains up to six distinct phases (also referred to as stages). However, certain phases are optional based on the transaction and response type. Alternatively, additional phases could also be added. A phase uses a particular signal group to communicate a particular type of information. In one implementation, these phases are:

Arbitration Phase
Request Phase
Error Phase
Snoop Phase
Response Phase
Data Transfer Phase In one mode, the data transfer phase is optional and is used if a transaction is transferring data. The data phase is request-initiated if the data is available at the time of initiating the request (for example, for a write transaction). The data phase is response-initiated if the data is available at the time of generating the transaction response (for example, for a read transaction). A transaction may contain both a request-initiated data transfer and a response-initiated data transfer.

Figure 3:
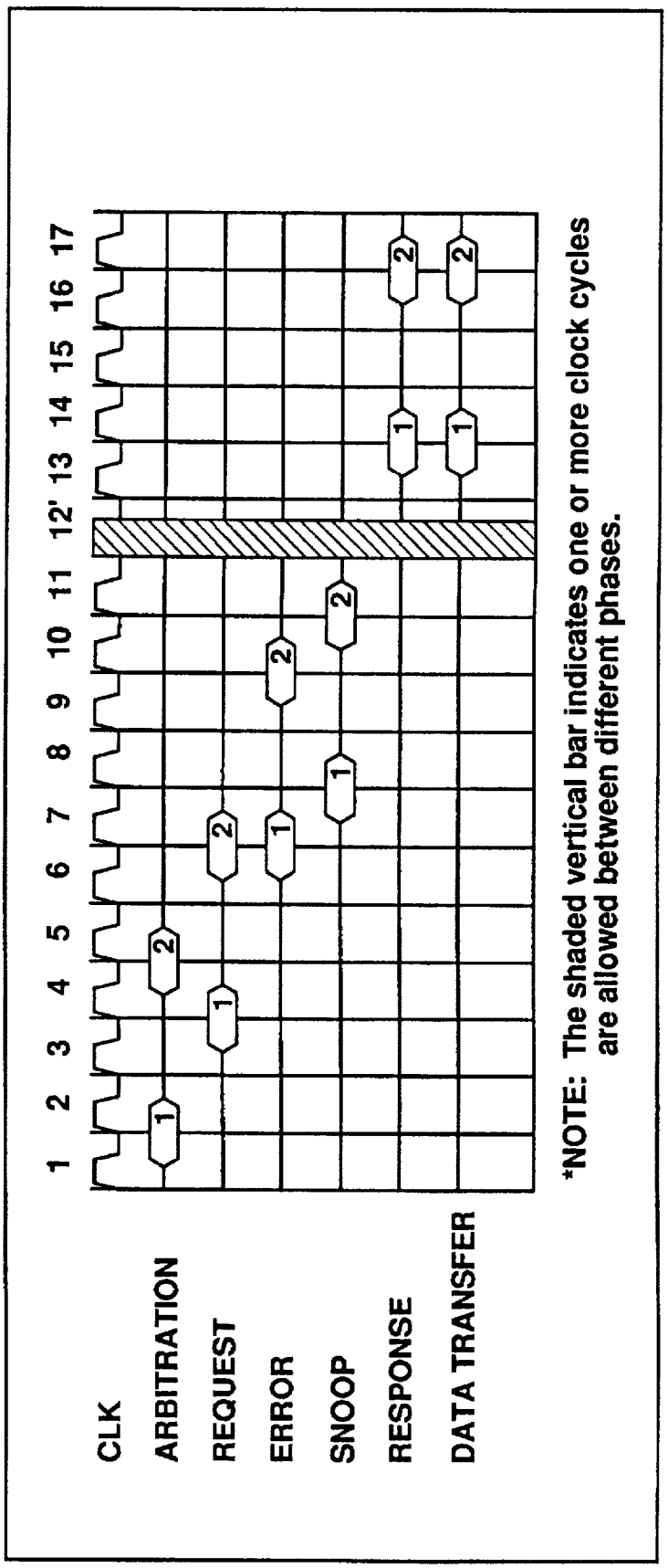
FIG. 3 shows an example of overlapped phases for two bus transactions according to one embodiment of the present invention.

Different phases from different transactions can overlap, thereby pipelining bus usage and improving bus performance. FIG. 3 shows an example of overlapped phases for two transactions. Referring to FIG. 3, transactions begin with an arbitration phase, in which a requesting agent becomes the bus owner. The arbitration phase needs to occur only if the agent that is driving the next transaction does not already own the bus. In one implementation, bus ownership is granted to the requesting agent in the arbitration phase two or more clocks after ownership is requested.

The second phase is the request phase, in which the bus owner drives a request and address information on the bus. In one implementation, the request phase is one or more clocks after bus ownership is granted (provided there is an arbitration phase), and is two clocks long. In the first clock, an address signal is driven along with the transaction address and sufficient information to begin snooping a memory access. In the second clock, the byte enables, a transaction identifier, and the requested data transfer length are driven, along with other transaction information.

The third phase of a transaction is an error phase. The error phase indicates any immediate errors, such as parity errors, triggered by the request. If an error is discovered, an error signal is asserted during the error phase by the agent which detected the error in the transaction. When an error is indicated, the transaction is immediately dropped (that is, the transaction progresses no further in the pipeline) and may be re-driven by the agent which issued the transaction. Whether the agent re-issues the transaction depends on the agent itself. In one implementation, the error phase is three clocks after the request phase.

In one implementation, transactions that are not canceled because of an error in the error phase have a snoop phase. The snoop phase indicates if the cache line accessed in a transaction is not valid, valid or modified (dirty) in any agent's cache. In one implementation, the snoop phase is four or more clocks from the request phase.

The snoop phase of the bus defines a snoop window during which snoop events can occur on the bus. A snoop event refers to agents transmitting and/or receiving snoop results via the bus. An agent which has snoop results which need to be driven during the snoop phase drives these snoop results as a snoop event during the snoop window. All snooping agents coupled to the bus, including the agent driving the results, receive these snoop results as a snoop event during the snoop window. In one implementation, the snoop window is a single bus clock.

In one embodiment, snoop results are indicated during the snoop phase using hit and modified hit signals. Assertion of the hit signal with the modified hit signal inactive indicates that a request issued on the bus hits the cache of another agent coupled to the bus. Assertion of the modified hit signal with the hit signal inactive indicates that the request issued on the bus hits the cache of another agent coupled to the bus and that the data in that cache is in a modified state. Additionally, according to the protocol used in one embodiment of the present invention, concurrent assertion of both hit and modified hit signals by an agent coupled to the bus indicates to stall the snoop pipeline of the bus. A stall on the snoop pipeline means that the present snoop phase (and the snoop pipeline) is stalled for a number of clocks, after which time it resumes its previous pace (assuming another stall is not asserted). In one implementation, a stall is for two clocks.

The response phase indicates whether the transaction failed or succeeded, whether the response is immediate or deferred, whether the transaction will be retried, or whether the transaction includes data phases. If a transaction contains a response-initiated data phase, then it enters the data transfer phase along with the response phase.

If the transaction does not have a data phase, then that transaction is complete after the response phase. If the requesting agent has write data to transfer, or has requested read data, the transaction has a data phase which may extend beyond the response phase. The data phase occurs only if a transaction requires a data transfer. The data phase can be response initiated (for example, by the memory controller or another processor) or request initiated.

The present invention accommodates deferred transactions by splitting a bus transaction into two independent transactions. The first transaction involves a request for data (or completion signals) by a requesting agent and a response by the responding agent. In one embodiment the request for data comprises the sending of an address on the address bus and a first token (also referred to as a transaction identifier). The response includes the sending of the requested data (or completion signals) if the responding agent is ready to respond, In this case, the bus transaction ends.

However, if the responding agent is not ready to complete the bus transaction, then the responding agent may send a deferred reply over the bus during the response phase. Sending of a deferred reply allows other transactions to be issued and not be held up by the completion of this transaction. The requesting agent receives this deferred reply. When the responding agent is ready to complete the deferred bus transaction, the responding agent arbitrates for ownership of the bus. Once bus ownership is obtained, the responding agent sends a deferred reply including a second token on the bus. The requesting agent monitors the bus and receives the second token as part of the deferred reply. The requesting agent latches the second token and determines whether the second token sent from the responding agent matches the first token. If the requesting agent determines that the second token from the responding agent does not match the first token (which the requesting agent generated), then the data on the bus (or the completion signal) is ignored and the requesting agent continues monitoring the bus. If the requesting agent determines that the second token from the responding agent does match the first token, then the data on the bus (or the completion signals) is the data originally requested by the requesting agent and the requesting agent latches the data on the data bus.

It is to be appreciated that, due to the pipelined nature of the bus, multiple transactions can be at different stages of the bus at different times. For example, one transaction can be in the snoop phase, while a second transaction is in the error phase, and yet a third transaction can be in the request phase. Thus, error signals and snoop signals can both be issued concurrently on the bus even though they correspond to different transactions.

In one embodiment of the present invention, up to eight transactions can be pending on the bus at any particular time and up to sixteen transactions can be waiting for a deferred response at any particular time.

Figure 4:
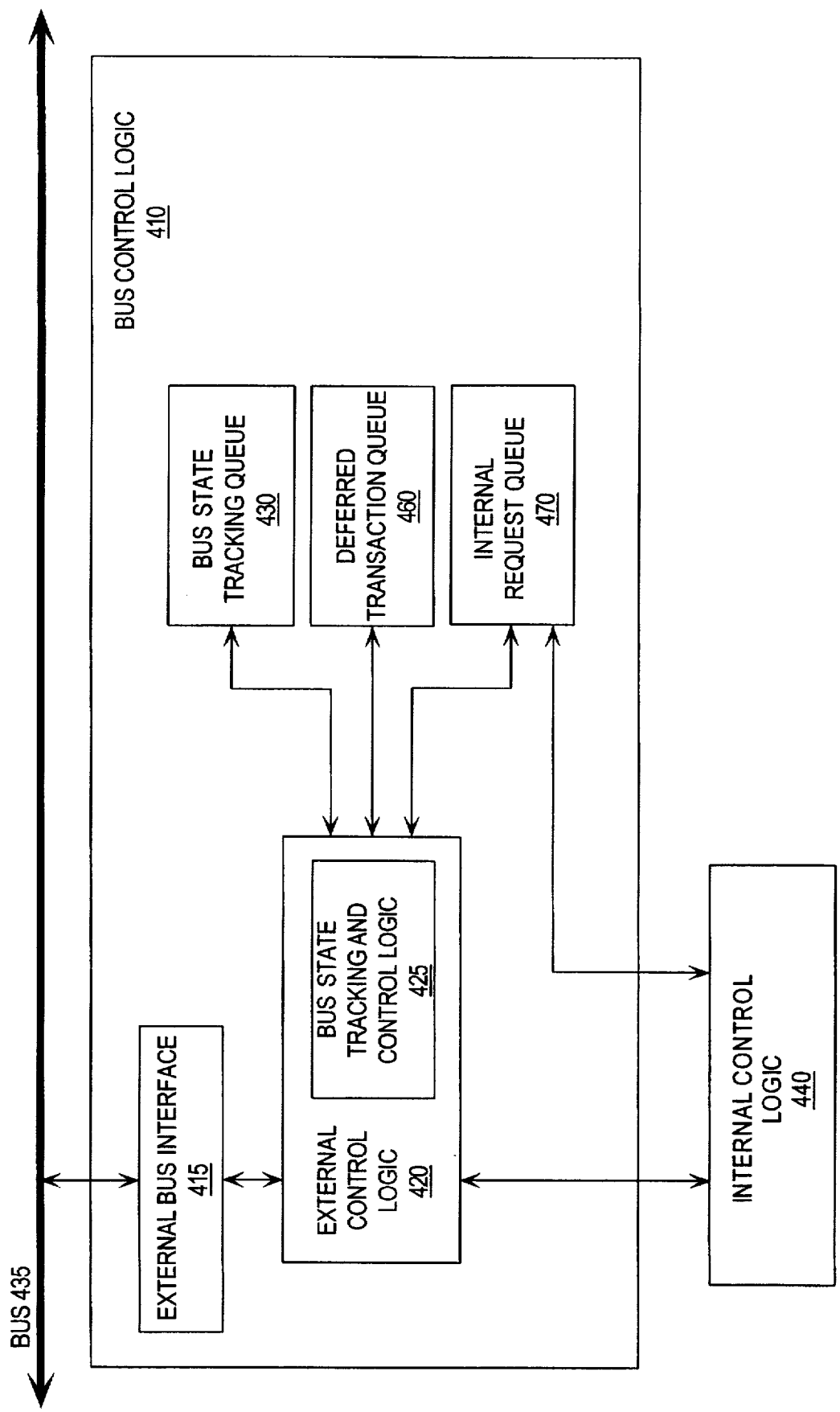
FIG. 4 illustrates bus control logic which provides an interface between a bus and the internal control logic of an agent according to one embodiment of the present invention.

FIG. 4 illustrates bus control logic which provides an interface between the bus and the internal control logic of an agent according to one embodiment of the present invention. In one embodiment, every bus agent coupled to an external bus, including processors, bus bridges, I/O controllers, memory interfaces and cluster controllers, incorporates bus control logic to interface with the bus. In one implementation, the external bus 435 is the processor-memory bus 101 of FIG. 1.

The bus control logic 410 acts as an interface between an agent, such as a processor or bus bridge, and the external bus 435, both of which may run at different clock speeds. The bus control logic 410 includes an external bus interface 415, an external control logic 420, and a bus state tracking queue 430.

The bus interface 415 contains the latches and necessary circuitry for interfacing between the bus control logic 410 and the bus 435.

The external control logic 420 implements the system bus protocol which allows the agent to interface with other agents via the bus 435. Thus, it is to be appreciated that different bus protocols can be used with the present invention by changing the external control logic 420. The external control logic 420 transfers requests between the bus 435 and the internal control logic 440. The external control logic 420 also includes bus state tracking and control logic 425 which tracks the status of all pending requests on the bus 435 using the bus state tracking queue 430.

Internal control logic 440 contains the necessary logic to perform the function of the agent. For example, if the agent is a bridge, then internal control logic 440 includes the logic to transfer requests between the buses. By way of another example, if the agent is a processor, then internal control logic 440 includes an execution unit, instruction fetch unit, etc. for processing instructions and data.

In one embodiment of the present invention, the external control logic 420 also includes error correcting and detecting logic (not shown) as well as external snoop logic (not shown). The error correcting and detecting logic generates Error Correcting Code (ECC) check bits for outgoing data and parity for outgoing addresses and requests, and also checks parity on incoming address, request and response pins and ECC on incoming data pins. The external snoop logic controls all snoop requests which are received from the system bus and, for processors, snoop requests which are received from the instruction fetch unit, data cache unit, or are self-generated.

The external control logic 420 is also coupled to the bus state tracking queue 430. The bus state tracking queue 430 maintains a record of bus transaction information regarding all transactions which are currently accessing the bus (that is, transactions which are currently pending in the bus pipeline). The bus state tracking and control logic 425 updates the bus state tracking queue 430 with information regarding the transactions as the transactions progress through the pipeline, as discussed in more detail below.

In one embodiment of the present invention, the bus control logic 410 also includes a deferred transaction queue 460. The deferred transaction queue 460 is coupled to the external control logic 420 and contains transactions which are waiting for deferred replies from agents on the bus. In one implementation, the deferred transaction queue 460 can hold up to sixteen transactions.

In one embodiment of the present invention, the bus control logic 410 also includes an internal request queue 470. In some devices, such as processors, the internal request queue 470 stores transactions which are being processed by the device. In one implementation, the transactions in the internal request queue 470 are those requests which were either placed on the bus by this device or require processing by this device.

In one embodiment of the present invention, the internal request queue has four elements. It is to be appreciated, however, that the internal request queue 470 can be any number of elements, such as two, eight, ten, etc.

In one embodiment, each transaction in the internal request queue 470 is assigned an internal transaction identifier which is the transaction identifier assigned to the transaction in the bus state tracking queue 430, as discussed in more detail below. It should be noted that two different transactions within the internal request queue 470 could have the same internal transaction identifier. For example, transaction X could be placed into the bus state tracking queue 430 which targets this agent. Transaction X is then placed into the internal request queue 470 and may be given a deferred response. While the internal control logic 440 is operating on transaction X, a subsequent transaction Y may be received by the agent and placed into the bus state tracking queue 430 and assigned the same internal transaction identifier as transaction X. If transaction Y also requires processing by internal control logic 440, then transaction Y is also placed into the internal request queue 470 with the same internal transaction identifier as transaction X.

In one embodiment of the present invention, internal control logic 440 updates the transaction information corresponding to a transaction based on the transaction identifier. In this embodiment, one implementation of resolving the problem of two requests having the same transaction identifier is that only the transaction which has the oldest transaction identifier and does not yet have the targeted results (such as snoop results) is the transaction which is updated.

Figure 5:
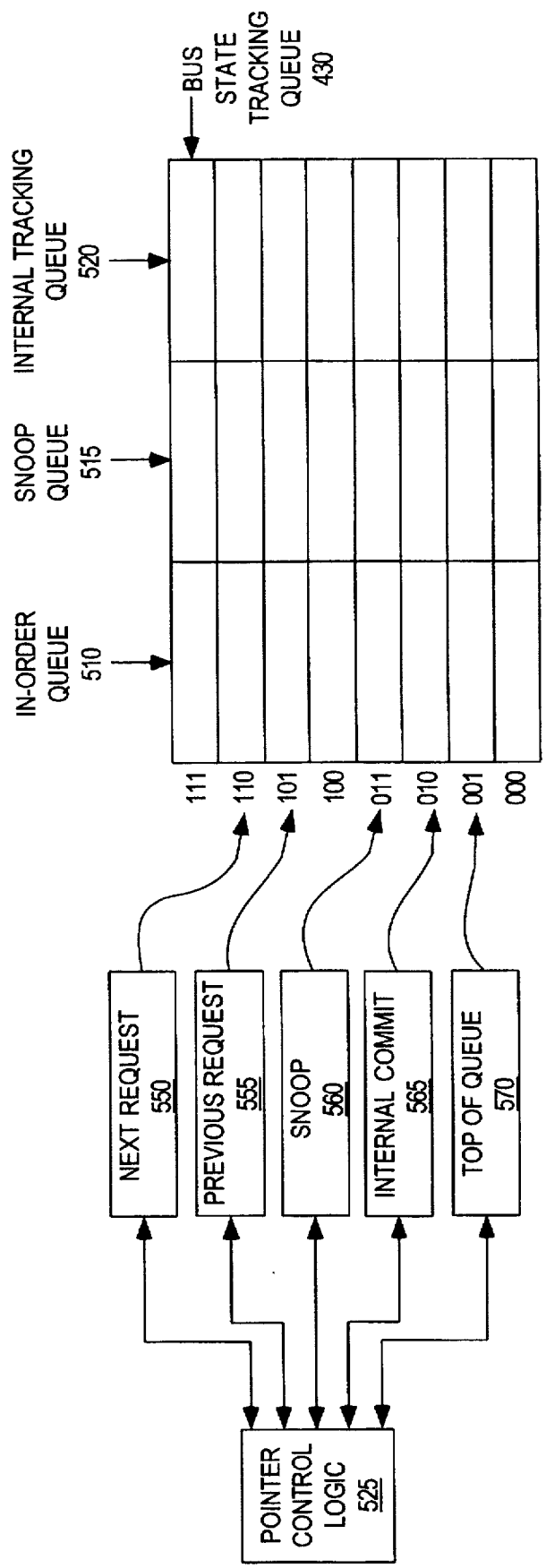
FIG. 5 is a block diagram showing the bus state tracking queue and part of the bus state tracking and control logic according to one embodiment of the present invention.

FIG. 5 is a block diagram showing the bus state tracking queue and part of the bus state tracking and control logic in more detail according to one embodiment of the present invention. In the embodiment shown in FIG. 5, the bus state tracking queue 430 is a single physical queue structure which is separated logically into the in-order queue 510, the snoop queue 515, and the internal tracking queue 520.

The bus state tracking queue 430 stores information in a separate element for each transaction which is currently pending on the bus (that is, each transaction in the bus pipeline). Thus, the bus state tracking queue 430 maintains a record of information regarding each transaction pending on the bus. In one embodiment of the present invention, the bus state tracking queue 430 has a number of elements equal to the number of transactions which can be outstanding on the bus at any one time. In one implementation, the bus state tracking queue 430 has eight elements.

In an alternate embodiment of the present invention, the number of elements in the bus state tracking queue 430 is greater than the number of transactions which can be outstanding on the bus at any one time. In another alternate embodiment, the number of elements in the bus state tracking queue 430 is less than the number of transactions which can be outstanding on the bus at any one time. In this alternate embodiment, an address throttling mechanism is used to prevent additional request phases from being entered when the bus state tracking queue is full.

The in-order queue 510 maintains a transaction target address and a transaction identifier, along with other transaction information, for each transaction in the bus state tracking queue 430. The snoop queue 515 maintains a record of whether the snoop phase for each transaction in the bus state tracking queue 430 has occurred and the corresponding snoop results. The internal tracking queue 520 tracks the state of each request in the bus state tracking queue 430 as the requests are being processed by the internal control logic 440.

The in-order queue 510, the snoop queue 515, and the internal tracking queue 520 are each first-in-first-out (FIFO) queues. Each time a transaction is removed from the top of the in-order queue 510, the corresponding snoop information is removed from the top of the snoop queue 515 and the corresponding control information is removed from the top of the internal tracking queue 520. Thus, the correspondence of elements in the queues 510, 515 and 520 is maintained.

In one embodiment of the present invention, each element in the bus state tracking queue contains 16 bits of transaction information. These 16 bits are as shown in Table I below.

TABLE I

| Field | Number of Bits | Description |
|---|---|---|
| Transaction Responding Agent (TRA) | 1 | This bit is set to indicate that the request assigned to this element is targeted to this bus agent. |
| Timed Out Request (TOR) | 1 | This bit is only supported by the agent which responds to unclaimed bus transactions. The TOR bit is activated if a transaction goes unclaimed on the bus for more than a predefined period of time. When this bit is activated, this bus agent is, by default, the responding agent. |
| Snoop Window Complete (SWC) | 1 | This bit is set when the snoop result phase for the request assigned to this element has completed. |
| Snoop Window Extension (SWE) | 1 | This bit is set when this bus agent needs to extend (stall) the snoop result phase. |
| Internal Operation Commit (IOC) | 1 | This bit is set by the target block of the internal control logic within the bus agent to indicate that the data operation is complete. The IOC bit may be set at the access initiation or during a later event. |
| RequestOR (RO) | 1 | This bit is set if this bus agent initiated the request assigned to this element. |
| Data Buffer Pointer (DB) | 1, 2 or 3 | These bits contain the pointer of the data buffer element (outbound or inbound) assigned to this request. The number of bits depends on the number of data buffer elements supported. One |

TABLE I-continued

| Field | Number of Bits | Description |
|---|---|---|
| | | bit is used for 1 or 2 data buffer elements, 2 bits are used for 3 or 4 elements, and 3 bits are used for 5 to 8 elements. |
| Transfer Direction (TRNDIR) | 1 | This bit specifies the direction of the data transfer requested for this access. In one implementation, a 1 indicates a write and a 0 indicates a read. |
| System Management Interrupt (SMI) | 1 | This bit is used to signal a synchronous system management mode (SMM) interrupt during the response phase of a transaction. For those implementations which do not support SMM, this bit can be deleted. |
| Response Type (RT) | 3 | These bits are used to determine the transaction response for a given request (see Table II below). |
| Data Length (LEN) | 2 | This field is used to specify the length of the data transfer of the original request. |

In one embodiment of the present invention, eight different response types are supported by the bus state tracking queue. These eight different responses are shown in Table II. One implementation of encoding these eight responses on the RT[2:0] bits is also shown in Table II.

TABLE II

| Response Type | RT[2:0] | Description |
|---|---|---|
| Configuration Address Cycle | [0 0 0] | This response encoding is used to indicate a transaction which all agents should operate on (e.g., a request targeting all agents on the bus). |
| Retry Response | [0 0 1] | This response is used to indicate that the request was unsuccessful. |
| Defer Response | [0 1 0] | This response is used to indicate that the agent will respond but that the response will be deferred. |
| Reserved | [0 1 1] | Reserved |
| Hard Failure Response | [1 0 0] | This response is used to respond to all unclaimed transactions when the system is configured to provide a hard failure response. |
| Normal Response without data | [1 0 1] | This response is sent when responding to a write transaction. |
| Implicit Write Back Response | [1 1 0] | This response is sent when responding to a transaction if a modified hit signal was asserted during the snoop phase for the transaction. |
| Normal Response with data | [1 1 1] | This response is sent when responding to a read transaction. |

The response type is identified in the bus state tracking queue 430 when the transaction is placed into the queue 430. The response type may also be modified during the Snoop Window or the Internal Status Update Window, as discussed in more detail below. The response type is dependent on the request type. For example, if the request is a read request, then a normal response with data is encoded. By way of another example, if the request is a write request, then a normal response without data is encoded.

FIG. 5 also shows five pointer structures. In one implementation, these five structures are part of the bus state tracking and control logic 425 of FIG. 4. These structures include the next request pointer 550, the previous request pointer 555, the snoop pointer 560, the internal commit pointer 565, and the top of queue pointer 570. Each of these five pointers identifies an element of the bus state tracking queue 430.

Bus state tracking and control logic 425 also includes pointer control logic 525. The pointer control logic 525 is coupled to and controls each of the pointers 550, 555, 560, 565, and 570. Pointer control logic 525 updates the pointers 550–570 when necessary, as discussed in more detail below.

The next request pointer 550 is a pointer to the head of the bus state tracking queue 430. The next request pointer 550 identifies the element of the queue 430 into which the next request received from the bus will be placed.

The previous request pointer 555 is a pointer to the element containing the transaction to which the current error phase corresponds. The previous request pointer 555 identifies the element which is one behind the next request pointer 550. If an error is indicated during the error phase, the next request pointer 550 is updated to point to the same element the previous request pointer 555 points to, thereby effectively erasing the transaction from the bus state tracking queue 430.

The snoop pointer 560 is a pointer to the request in the queue 430 corresponding to the current snoop window. The snoop pointer 560 indicates the element containing the transaction to which the current snoop window corresponds. Thus, when a stall signal or indication is issued on the bus, the snoop pipeline can be stalled by keeping the snoop pointer 560 pointing to the same element of the queue 430.

The internal commit pointer 565 is a pointer to the element containing the transaction which is receiving (or is next to receive) an internal commit. The internal commit pointer 565 indicates the element which is receiving (or is next to receive) internal status information from the internal control logic 440 of FIG. 4.

The top of queue pointer 570 is a pointer to the tail of the bus state tracking queue 430. The top of queue pointer 570 indicates the element of the queue 430 which contains the oldest active transaction on the bus (that is, the oldest transaction currently pending on the bus).

In one embodiment of the present invention, each transaction in bus state tracking queue 430 is assigned a unique transaction identifier. Thus, each of the elements within bus state tracking queue 430 can be directly accessed by the pointer structures. In one implementation, the bus state tracking queue 430 is organized as a circular buffer. In this implementation, the bus state tracking queue 430 is filled with transactions from the bottom to top, and after the top element of the queue has been filled, the next transaction is placed into the bottom element.

In one embodiment of the present invention, the bus control logic 410 knows when the bus state tracking queue 430 is full when next request pointer 550 and the top of queue pointer 570 indicate the same element of queue 430. In this situation, bus control logic 410 can prevent transactions from this agent from being issued on the bus and can assert a bus error signal if additional transactions are placed on the bus.

In one embodiment, transactions are assigned an identifier as they are placed into the bus state tracking queue 430. In one implementation, the identifier is a number assigned based on the location within the queue 430. For example, the bottom of the queue can have an identification number of $000_2$ and the top of the queue can have an identification number of $111_2$. It is to be appreciated that a queue with eight elements can provide eight unique identification numbers using a three-bit identifier.

It is to be appreciated that other identification schemes can also be used, and that an identifier larger or smaller than three bits can be used, based on the size of bus state tracking queue 430.

It is also to be appreciated that although the elements 550, 555, 560, 565, and 570 are discussed as being pointer structures, the present invention is not limited to pointer structures. Any of a wide variety of conventional tracking elements can be used to identify locations within the bus state tracking queue 430.

In an alternate embodiment of the present invention, the in-order queue 510, the snoop queue 515, and the internal tracking queue 520 are three physically separate queues. In this embodiment, certain pointers are duplicated for each of the queues. For example, each of the three queues has its own corresponding next request pointer 550, previous request pointer 555, and top of queue pointer 570. However, only the snoop queue has a corresponding snoop pointer 560 and only the internal tracking queue 520 has a corresponding internal commit pointer 565. Additionally, the pointers to the three queues 510, 515, and 520 are synchronized so that correspondence of elements between the queues is maintained. For example, the top of queue pointer is updated for each queue to point to the element containing the same transaction when a transaction is removed from the queue.

Figure 6:
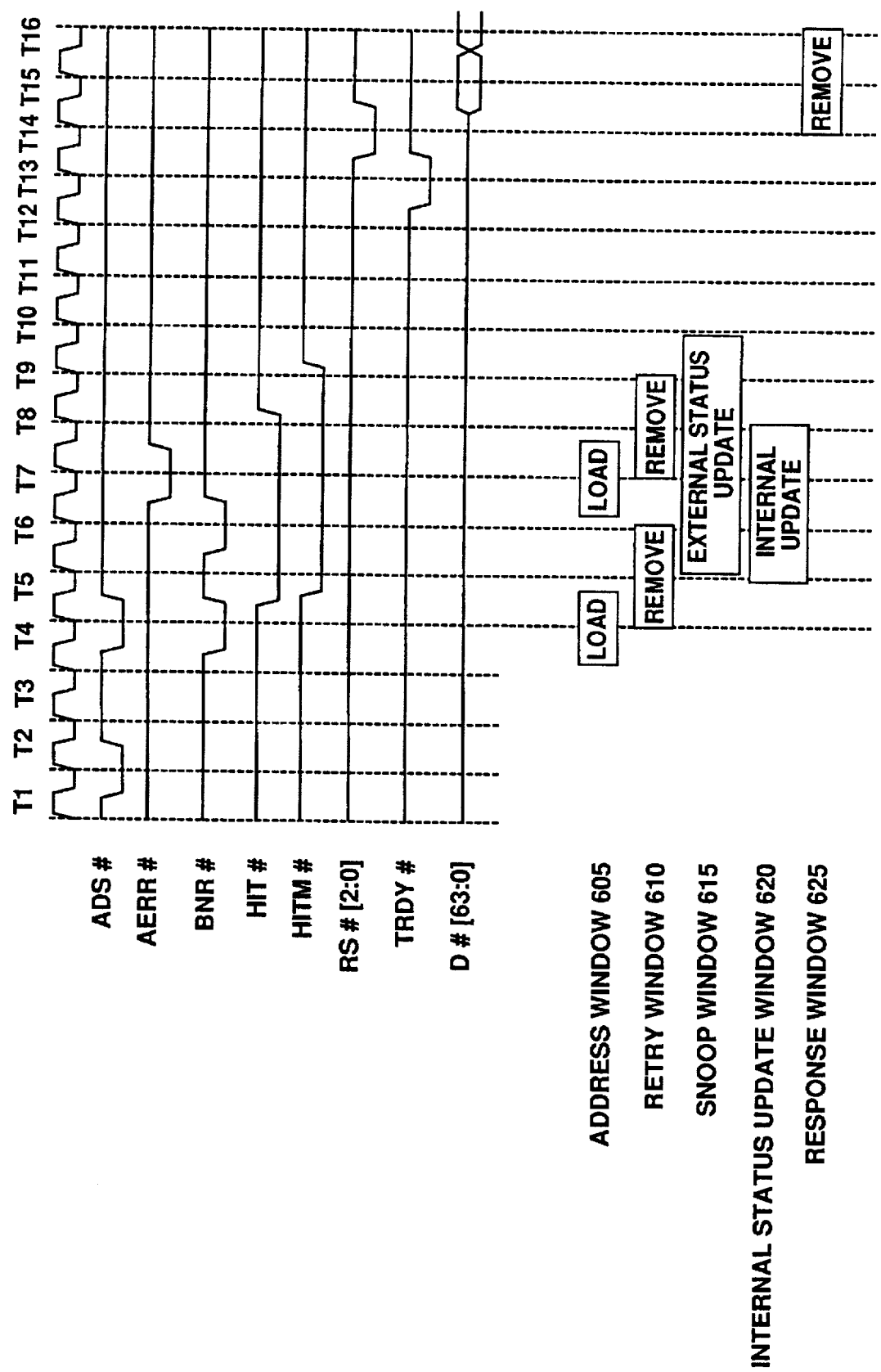
FIG. 6 is a timing diagram showing which events on the bus affect the bus state tracking queue according to one embodiment of the present invention.

FIG. 6 is a timing diagram showing which events on the bus affect the bus state tracking queue according to one embodiment of the present invention. Several bus signals are shown in FIG. 6. These signals are described in more detail below in Table III. In one embodiment, each of the signals shown in Table III can be input to or output from a bus agent. It is to be appreciated that additional address and control signals can also be used in transferring information between the bus and a bus agent, however these signals have not been shown so as not to obscure the present invention.

TABLE III

| Signal | Description |
| --- | --- |
| ADS# | Address Strobe. Indicates that the current clock cycle is the beginning of a request on the bus. In one implementation, the request is two cycles. |
| AERR# | Address Parity Check. Asserted when either an address or request parity error occurs. |
| BNR# | Block Next Request. Used to block the current request bus owner from issuing new requests. |
| HIT# | Hit. Indicates that a caching agent holds an unmodified version of the requested cache line. Also, indicates to extend the snoop window when driven in conjunction with HITM#. |
| HITM# | Hit Modified. Indicates that a caching agent holds a modified version of the requested cache line and that the agent holding the modified version assumes responsibility for providing the line. |
| RS#[2:0] | Response. Indicates type of response for the request. |
| TRDY# | Target Ready. Used with a write command to indicate the target agent is ready to receive the write data. |
| D#[63:0] | Data. |

FIG. 6 also shows five separate windows which are defined by the signals on the bus. These windows are the address window 605, the retry window 610, the snoop window 615, the internal status update window 620, and the response window 625. The timing of these windows and the changes to the bus state tracking queue 430 during these windows is discussed in more detail below.

Address Window: Transactions are loaded into the bus state tracking queue 430 during the Address Window. In one implementation, the Address Window occurs two clocks after ADS# is sampled active on the bus, thereby preventing an overlap between the Address Window of the current transaction and the Retry Window of the previous transaction.

In one implementation, each of the bits of the bus state tracking queue 430 element as shown in Table I above is loaded with its appropriate value during the Address Window. The appropriate values for an element are dependent on the nature of the request (e.g., a read request or a write request) and which agent issued the request.

In one implementation, the IOC bit for agents which are not targeted by the request is set to a '1' during the Address Window.

Retry Window: If an error is indicated during the error phase, then the transaction is removed from the bus state tracking queue during the Retry Window.

In one implementation, the Retry Window occurs one clock after the Address Window. If the AERR# signal is activated during the Retry Window then that transaction is aborted and is removed from the bus state tracking queue 430. However, if the AERR# signal is inactive during the Retry Window, then the transaction remains in the bus state tracking queue 430 and is not removed from the queue 430 until the response phase for the transaction has been completed.

Snoop Window: The bus state tracking queue 430 is modified during the snoop phase for a transaction. In one embodiment, the bus state tracking queue 430 is updated at the end of the snoop phase to indicate that the snoop operation for this transaction is complete.

In one implementation, if an agent indicates a hit to a modified cache line (e.g., HITM# is asserted), then the response bits (e.g., RT#[2:0]) are set to indicate an implicit write back operation is required. Therefore, the response that will be generated for this transaction is an Implicit Write Back response.

In one implementation, the SWC bit of the bus state tracking queue is set to a '1' to indicate that the snoop operation for this transaction is complete.

Internal Status Update Window: The response from this bus agent to a request can be placed in the bus state tracking queue during the Internal Status Update Window. In one embodiment, a transaction where the response is from this agent does not enter the response phase until the snoop phase has completed (e.g., SWC is set to a '1') and an internal commit indication is received (e.g., IOC is set to a '1'). In one implementation, only the bus agent which is to respond to the request updates its bus state tracking queue during the Internal Status Update Window.

In one implementation, the Internal Status Update Window is used by those agents that need to modify the RT#[2:0] bits. The RT#[2:0] bits are set, at the initiation of a transaction, to provide either a Normal with Data or a Normal Without Data Response. The RT#[2:0] bits may be modified, however, during the Internal Status Update Window as the result of some internal problem such as a hard failure or a system management mode response. By way of another example, the RT#[2:0] bits may be modified to indicate an implicit write back, a deferred response, or a retry response.

The Internal Status Update Window can also be used by devices that need to change the DB field.

In one implementation, the SWE bit is set to a '0' during the Internal Status Update Window. Additionally, the IOC bit is set to a '1' during the Internal Status Update Window.

In one implementation, an Internal Status Update Window event is needed if the IOC bit is set to a '0' or the SWE bit is set to a '1' in the bus state tracking queue. Note that the SWC bit will not be set to a '1' until the SWE bit, if originally set to a '1' is reset to a '0', which occurs during the Internal Status Update Window. However, if the IOC bit is set to a '1' and the SWE bit is set to a '0', then an Internal Status Update Window event is not necessary.

In one implementation, the SMI bit can be set during the Internal Status Update Window for systems which support a synchronous SMM mode. The SMI bit is set to a '1' to indicate a synchronous SMM interrupt.

Response Window: During the Response Window the bus state tracking queue 430 element at the top of the queue 430 is removed (that is, popped off the queue). The Top-of-Queue pointer to the bus state tracking queue 430 is incremented so that the next element in the bus state tracking queue 430 is the top of the queue.

It should be noted that an agent's bus state tracking queue 430 observes the same Response Window as all other agents on the bus, regardless of whether the agent is responsible for the Response Phase of the transaction.

In one implementation, the Response Window is entered one clock after the RS#[2:0] signals on the bus have been sampled active.

In one implementation, systems which support a synchronous SMM set the SMI bit to a '0' during the Response Window.

In one implementation, the TRA bit and the TOR bit are both set to a '0' during the Response Window.

It is to be appreciated that the timings shown in FIG. 6 are shown as an example only. It will be understood by those skilled in the art that the timing of changing the bus state tracking queue 430 as shown in FIG. 6 can be altered.

In one embodiment of the present invention, the updating of four of the five windows of the bus state tracking queue shown in FIG. 6 can overlap. That is, the updating which occurs during four of the five windows can occur simultaneously for different transactions. In one implementation, the Address and the Retry Windows cannot occur concurrently, however any of the other three windows can overlap one of these two. For example, the bus state tracking queue can be updated simultaneously in the Address Window for a first transaction, the Snoop Window for a second transaction, the Internal Status Update Window for a third transaction, and the Response Window for a fourth transaction.

It is to be appreciated that although the bus state tracking queue is described above as being a queue structure, any of a wide variety of conventional buffer devices can be used to implement the bus state tracking queue of the present invention.

Whereas many alterations and modifications of the present invention will be comprehended by a person skilled in the art after having read the foregoing description, it is to be understood that the particular embodiments shown and described by way of illustration are in no way intended to be considered limiting. References to details of particular embodiments are not intended to limit the scope of the claims.

Thus, a method and apparatus for tracking transactions in a pipelined bus has been described.

What is claimed is:

1. An apparatus for tracking all transactions pending on a pipelined bus, wherein the pipelined bus has a plurality of phases, and wherein the apparatus comprises:

a bus state tracking queue which maintains a record of bus transaction information for each of a plurality of transactions pending on the pipelined bus regardless of which of one or more agents coupled to the pipelined bus initiated each of the plurality of transactions, wherein the bus state tracking queue includes a plurality of elements; and control logic, coupled to the bus state tracking queue, for updating the bus transaction information for each of the plurality of transactions as each of the plurality of transactions progresses through the plurality of phases, wherein the control logic includes a plurality of tracking elements which identify individual elements of the plurality of elements in the bus state tracking queue.

2. The apparatus of claim 1, wherein the bus state tracking queue includes a snoop queue which maintains a record of whether a snoop phase for each transaction of the plurality of transactions has been completed.

3. The apparatus of claim 1, wherein the bus state tracking queue includes a separate element for each of the plurality of transactions.

4. The apparatus of claim 1, wherein the plurality of tracking elements includes a next request pointer for identifying a next element of the bus state tracking queue which will receive a request from the pipelined bus.

5. The apparatus of claim 1, wherein the plurality of tracking elements includes a previous request pointer for identifying an element of the bus state tracking queue which most recently received a request from the pipelined bus.

6. The apparatus of claim 1, wherein the plurality of tracking elements includes a snoop pointer for identifying an element of the bus state tracking queue which contains a transaction corresponding to a current snoop window of the pipelined bus.

7. The apparatus of claim 1, wherein the plurality of tracking elements includes an internal commit pointer for identifying an element of the bus state tracking queue which is next to receive internal status information.

8. The apparatus of claim 1, wherein the plurality of tracking elements includes a top of queue pointer for identifying an oldest active transaction on the pipelined bus.

9. The apparatus of claim 1, wherein the control logic removes a transaction at the top of the bus state tracking queue from the bus state tracking queue when the transaction is no longer pending on the pipelined bus.

10. A computer system comprising:
   a pipelined bus, wherein the pipelined bus has a plurality of phases; and
   a plurality of agents coupled to the pipelined bus, each of the plurality of agents including,
   a bus state tracking queue which maintains a record of bus transaction information for each and every transaction of a plurality of transactions pending on the pipelined bus regardless of which of the plurality of agents initiated each of the plurality of transactions, wherein the bus state tracking queue includes a plurality of elements, and
   control logic, coupled to the bus state tracking queue, for updating the bus transaction information for each of the plurality of transactions as each of the plurality of transactions progresses through the plurality of phases, wherein the control logic includes a plurality of tracking elements which identify individual elements of the plurality of elements in the bus state tracking queue.

11. The system of claim 10, wherein the plurality of tracking elements includes a next request pointer for identifying a next element of the bus state tracking queue which will receive a request from the pipelined bus.

12. The system of claim 10, wherein the plurality of tracking elements includes a previous request pointer for identifying an element of the bus state tracking queue which most recently received a request from the pipelined bus.

13. The system of claim 10, wherein the plurality of tracking elements includes a snoop pointer for identifying an element of the bus state tracking queue which contains a transaction corresponding to a current snoop window of the pipelined bus.

14. The system of claim 10, wherein the plurality of tracking elements includes an internal commit pointer for identifying an element of the bus state tracking queue which is next to receive internal status information.

15. The system of claim 10, wherein the plurality of tracking elements includes a top of queue pointer for identifying an oldest active transaction on the pipelined bus.

16. A method for tracking all transactions pending on a pipelined bus, wherein the pipelined bus has a plurality of phases, and wherein the method comprises the steps of:
   (a) loading first bus transaction information into a first element of a plurality of elements of a bus state tracking queue in response to a first request being placed on the pipelined bus by any agent coupled to the pipelined bus;
   (b) updating the first bus transaction information in the bus state tracking queue as the first request progresses through the plurality of phases;
   (c) updating a plurality of pointers which identify individual elements of the plurality of elements in the bus state tracking queue as the first request progresses through the plurality of phases; and
   (d) removing the first request from the bus state tracking queue when the request has been completed.

17. The method of claim 16, further comprising the steps of:
   loading second bus transaction information into a second element of the plurality of elements of the bus state tracking queue in response to a second request being placed on the bus, the second bus transaction information corresponding to the second request;
   updating the plurality of pointers as the second request progresses through the plurality of phases; and
   removing the second bus transaction information from the bus state tracking queue responsive to an error being indicated.

18. The method of claim 16, further comprising the step of updating the first bus transaction information in the bus state tracking queue responsive to snoop results corresponding to the first request being received on the bus.

19. The method of claim 16, further comprising the step of updating the first bus transaction information in the bus state tracking queue responsive to internal control information received from internal control logic of an agent coupled to the bus.

20. An apparatus for tracking all transactions pending on a pipelined bus, wherein the pipelined bus has a plurality of phases, and wherein the apparatus comprises:
   means for maintaining, in a plurality of separate elements, a record of bus transaction information for each of a plurality of transactions pending on the pipelined bus regardless of which of one or more agents coupled to the pipelined bus initiated each of the plurality of transactions; and
   means for updating, coupled to the means for maintaining, the bus transaction information for each of the plurality of transactions as each of the plurality of transactions progresses through the plurality of phases, wherein the means for updating includes a plurality of tracking means for identifying individual elements of the plurality of elements in the means for maintaining.

21. The apparatus of claim 20, wherein the means for updating removes a transaction from the means for maintaining when the transaction is no longer pending on the pipelined bus.

22. The apparatus of claim 20, wherein the means for maintaining includes a means for maintaining a record of whether a snoop phase for each transaction of the plurality of transactions has been completed.

* * * * *